(12) United States Patent
Han

(10) Patent No.: US 8,723,820 B1
(45) Date of Patent: May 13, 2014

(54) METHODS AND APPARATUS RELATED TO A HAPTIC FEEDBACK DRAWING DEVICE

(75) Inventor: Amy Han, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 488 days.

(21) Appl. No.: 13/028,916

(22) Filed: Feb. 16, 2011

(51) Int. Cl.
    *G06F 3/041* (2006.01)
(52) U.S. Cl.
    USPC .................. 345/173; 345/179; 178/18.01
(58) Field of Classification Search
    USPC ............... 345/173–184; 178/18.01–20.04
    See application file for complete search history.

(56) References Cited

U.S. PATENT DOCUMENTS

| | | | |
|---|---|---|---|
| 5,862,049 A * | 1/1999 | Sato et al. ................... | 700/85 |
| 7,327,348 B2 | 2/2008 | Goldenberg et al. | |
| 7,602,384 B2 | 10/2009 | Rosenberg et al. | |
| 8,253,686 B2 * | 8/2012 | Kyung et al. ................. | 345/158 |
| 8,416,066 B2 * | 4/2013 | Westerinen et al. ........ | 340/407.2 |
| 2002/0097223 A1 | 7/2002 | Rosenberg | |
| 2005/0057534 A1 | 3/2005 | Charlier | |
| 2007/0298877 A1 | 12/2007 | Rosenberg | |
| 2008/0284257 A1 | 11/2008 | Cope et al. | |
| 2009/0079703 A1 * | 3/2009 | Kyung et al. ................. | 345/173 |
| 2009/0127006 A1 * | 5/2009 | Lynggaard ................ | 178/19.01 |
| 2009/0135164 A1 * | 5/2009 | Kyung et al. ................. | 345/179 |
| 2009/0251440 A1 * | 10/2009 | Edgecomb et al. .......... | 345/179 |
| 2010/0009322 A1 * | 1/2010 | Da Silva Rocha ........... | 434/160 |
| 2010/0250071 A1 * | 9/2010 | Pala et al. .................. | 701/48 |
| 2010/0265214 A1 * | 10/2010 | Green et al. .................. | 345/174 |
| 2010/0327065 A1 * | 12/2010 | Van Schaack et al. ........ | 235/454 |
| 2011/0032204 A1 * | 2/2011 | Pryor .......................... | 345/173 |
| 2011/0043077 A1 * | 2/2011 | Yeh et al. ...................... | 310/338 |
| 2011/0148774 A1 * | 6/2011 | Pihlaja ......................... | 345/173 |
| 2011/0157056 A1 * | 6/2011 | Karpfinger ................... | 345/173 |
| 2011/0193797 A1 * | 8/2011 | Unruh .......................... | 345/173 |
| 2011/0258565 A1 * | 10/2011 | Arscott et al. ................ | 715/763 |
| 2012/0050231 A1 * | 3/2012 | Westhues et al. ............. | 345/179 |
| 2012/0127088 A1 * | 5/2012 | Pance et al. .................. | 345/173 |
| 2012/0169607 A1 * | 7/2012 | Tiitola ......................... | 345/173 |
| 2012/0256863 A1 * | 10/2012 | Zhang et al. ................. | 345/173 |
| 2013/0021288 A1 * | 1/2013 | Karkkainen et al. ......... | 345/173 |
| 2013/0222311 A1 * | 8/2013 | Pesonen, Mika ............ | 345/173 |

* cited by examiner

*Primary Examiner* — Amare Mengistu
*Assistant Examiner* — Vinh Lam
(74) *Attorney, Agent, or Firm* — Brake Hughes Bellermann LLP

(57) ABSTRACT

In one general aspect, a computer-readable storage medium can be configured to store instructions that when executed cause a computing device to perform a process. The instructions can include instruction to receive, at a haptic feedback module of the computing device, an indicator of a surface type, and receive a parameter value characterizing an interaction of a drawing device with a touch sensitive display of the computing device. The instructions can include instructions to access a surface definition file from a library of surface definition files at the computing device based on the indicator of the surface type, and define, based on the parameter value characterizing the interaction and based on the surface definition file, a movement instruction configured to trigger a movement in the drawing device. The instructions can include instructions to send the movement instruction to the drawing device.

20 Claims, 7 Drawing Sheets

Receive a movement instruction at a drawing device 400

Trigger, based on the movement instruction, a movement of the drawing device using a movement mechanism 410

| Surface Identifiers 510 | Surface Conditions 520 | Movement Instructions 530 |
|---|---|---|
| S1 | P1 > A1 | M1 |
| | P1 < A2 | |
| | P2 = A3 | M3 |
| | P3 and P4 = Any value | M2 |
| S2 | P1 = 0 | |

| Writing Instrument Identifiers 710 | Writing Instrument Conditions 720 | Movement Instructions 730 |
|---|---|---|
| X1 | Q1 > G1 or Q2 < G4 | F1 |
|  | Q2 = G3 | F2 |
| X2 | Q3 > 0 | F3 |

US 8,723,820 B1

METHODS AND APPARATUS RELATED TO A HAPTIC FEEDBACK DRAWING DEVICE

TECHNICAL FIELD

This description relates to user input devices associated with a computing device.

BACKGROUND

Many known computing devices can have several mechanisms through which a user may interact with (e.g., trigger) one or more functions of the computing device. For example, user input devices such as keyboards, mouse devices, touch screen displays and/or so forth, through which a user may interact with computing devices to perform one or more computing functions, can be connected with and/or integrated into the computing devices. However, these user input devices may be cumbersome to use and/or may not produce results at a desirable speed, level of accuracy, and/or with a desired effect.

SUMMARY

In one general aspect, a computer-readable storage medium can be configured to store instructions that when executed cause a computing device to perform a process. The instructions can include instruction to receive, at a haptic feedback module of the computing device, an indicator of a surface type, and receive a parameter value characterizing an interaction of a drawing device with a touch sensitive display of the computing device. The instructions can include instructions to access a surface definition file from a library of surface definition files at the computing device based on the indicator of the surface type, and define, based on the parameter value characterizing the interaction and based on the surface definition file, a movement instruction configured to trigger a movement in the drawing device. The instructions can include instructions to send the movement instruction to the drawing device.

In another general aspect, a method can include receiving a parameter value characterizing an interaction of a drawing device with a surface of a display of a computing device, and accessing a writing instrument definition file at the computing device based on an indicator of a writing instrument type associated with the drawing device. The method can include defining, based on the parameter value characterizing the interaction and based on the writing instrument definition file. The movement instruction can be configured to trigger a movement of the drawing device simulating a tactile interaction of the writing instrument type with the surface of the display.

In yet another general aspect, an apparatus can include a tip of a drawing device configured to contact a display of a computing device during a first portion of a haptic feedback cycle. The apparatus can include a wireless module of the drawing device configured to receive a movement instruction from a computing device during a second portion of the haptic feedback cycle, and a movement mechanism of the drawing device configured to trigger a movement of the drawing device simulating a tactile interaction of a writing instrument type with a surface type based on the movement instruction.

The details of one or more implementations are set forth in the accompanying drawings and the description below. Other features will be apparent from the description and drawings, and from the claims.

BRIEF DESCRIPTION OF THE DRAWINGS

FIG. 4 is a flowchart that illustrates a method for triggering movement of a drawing device.

FIG. 5 is a diagram that illustrates entries in a surface database.

DETAILED DESCRIPTION

Figure 1:
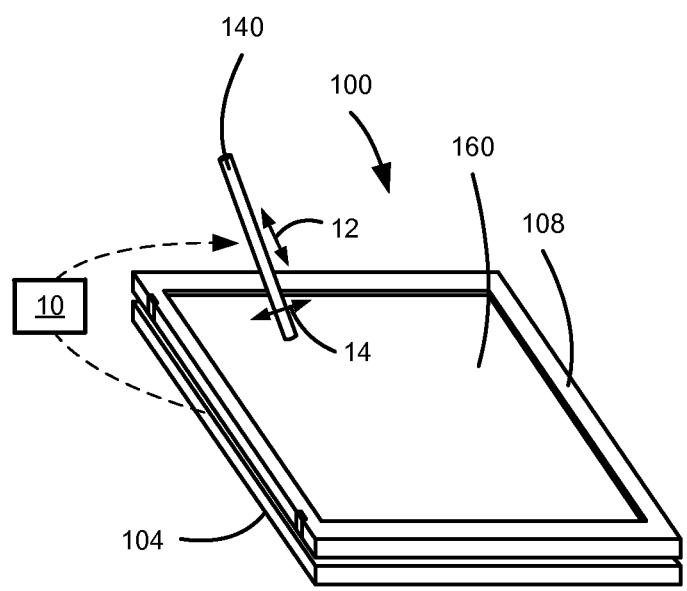
FIG. 1 is a diagram that illustrates a drawing device configured to receive a movement instruction configured to trigger a movement of the drawing device.

FIG. 1 is a diagram that illustrates a drawing device 140 configured to receive a movement instruction 10 configured to trigger a movement of the drawing device 140. The movement instruction 10 can be configured to trigger a combination of movements (e.g., haptic type movements) of the drawing device 140 in response to an interaction (e.g., a parameter value characterizing an interaction) of the drawing device 140 with a touch sensitive display 160 of a computing device 100. The interaction can include, for example, moving a portion of the drawing device 140 (by a user) along a surface of the touch sensitive display 160 to define, for example, one or more marks (e.g., lines, curves), one or more glyphs, portions of a drawing, alpha-numeric characters (which can be defined by one or more glyphs), and/or so forth. As shown in FIG. 1, the touch sensitive display 160 is included in a display portion 108 of the computing device 100, and the computing device 100 also has a base portion 104. In some embodiments, the computing device 100 may not have a separate display portion 108 and base portion 104.

The movement instruction 10 can be configured to trigger the movement of the drawing device 140 so that a user handling the drawing device 140 may receive a sensation of moving the drawing device 140 along a particular surface type. In other words, the movement instruction 10 can be configured to trigger a movement in the drawing device 140 to simulate an interaction (e.g., a tactile interaction) of the drawing device 140 with, for example, a physical surface of a particular type. The surface type can be, for example, a paper surface, a cardboard surface, a glass surface, a glossy paper surface, a concrete surface, a plastic surface, and so forth.

The movement instruction 10 can be configured to trigger the movement of the drawing device 140 so that a user handling the drawing device 140 may receive a sensation of using a particular writing instrument type. In other words, the movement instruction 10 can also be configured to trigger a movement in the drawing device 140 to simulate use of a particular writing instrument type. The writing instrument type can be, for example, a ballpoint pen, a pencil, a crayon, a quill pen, and so forth. In some embodiments, the writing instrument type can have a particular characteristic that can be simulated by movements triggered by the movement instruction 10. For example, if the writing instrument type is a pencil, the writing instruction 10 can be configured to trigger movement of the drawing device 140 to simulate the pencil with a dull, blunt tip, or simulate the pencil with a freshly sharpened tip.

For example, the movement instruction 10 can be defined to trigger movement of the drawing device 140 so that a user handling the drawing device 140 may feel as though the drawing device 140 is a pencil contacting a surface of a piece of paper. In such instances, the movement instruction 10 can be defined so that the drawing device 140 responds as a pencil would respond when a user is writing with the pencil on the paper surface, a marker on a whiteboard, or a stick in sand. Specifically, the movement instruction 10 can trigger movements in the drawing device 140 that may simulate the type of friction, bumps, acceleration, and/or so forth that a user would feel if moving the pencil along the surface of the piece of paper. The bumps can be simulated with upward and downward movement (which may be regular and/or may be random) that may occur when contacting fibers of a piece of paper. The friction can be simulated with movements (e.g., linear movements, rotational movements) that cause a force on an area of the drawing device 140 that may be handled by a user. The force of the movements can be in a direction opposite the movement of the drawing device 140 to simulate the friction.

As shown in FIG. 1, the movement instruction 10 is configured to trigger a combination of a vertical movement 12 and a horizontal movement 14 of the drawing device 140 in response to an interaction of the drawing device 140 with the touch sensitive display 160 of the computing device 100. The vertical movement 12 and horizontal movement 14 of the drawing device 140 can be coordinated to simulate contact of a particular type of writing instrument on a particular type of writing surface.

In some embodiments, a movement instruction such as movement instruction 10 can be configured to cause a variety of movements in a drawing device such as drawing device 140. For example, a movement instruction can be configured to cause a vibrational movement, a pulsed movement, a random movement, a rotational movement, a diagonal movement, and/or so forth of a drawing device. In some embodiments, the movements can be along any direction (any combination of x, y, and z direction). In some embodiments, multiple different types of movements (e.g., linear movements, rotational movements, vibrational movements) can be used in any combination (e.g., in an overlapping combination, in a simultaneous combination, in a staggered combination). In some embodiments, a rotational movement of a weight by a motor disposed within the drawing device 140 can cause a sensation of resistance (i.e., friction) against a hand of a user of the drawing device 140. A vibrational movement (e.g., a vibrational movement in a vertical direction and/or a horizontal direction) cause by a motor can be used to simulate a bumpy writing surface.

The movement instruction 10 can be characterized as a haptic feedback signal sent from the computing device 100 to the drawing device 140 in response to one or more interactions of the drawing device 140 with the surface of the touch sensitive display 160. Specifically, the movement instruction 10 can be a haptic feedback signal defined based on one or more parameter values representing (e.g., characterizing) at least a portion of the interaction(s) of the drawing device 140 with the surface of the touch sensitive display 160. Accordingly, the parameter value(s) representing the interaction(s) of the drawing device 140 with the surface of the touch sensitive display 160 and the movement instruction 10 can be defined and/or used during a haptic feedback loop (e.g., during a cycle of the feedback loop).

Parameter values representing an interaction can include, for example, an acceleration value, a length value (representing a physical length of an interaction), a direction value, a pressure value, a timing value, a vector, a duration value (representing a duration of an interaction), a speed value, and/or so forth. In some embodiments, the parameter values can be referred to as haptic parameter values. In some embodiments, one or more parameter values can be defined based on one or more raw signals (e.g., raw electrical signals) defined in response to or representing interactions with the touch sensitive display 160.

For example, when the drawing device 140 is moved with a particular acceleration and in a particular direction against the surface of the touch sensitive display 160 during an interaction, the computing device 100 can be configured to define an acceleration value and a direction value characterizing the interaction. The acceleration value and the direction value can be defined during a first portion of a haptic feedback loop. The movement instruction 10 can be defined based on the acceleration value and the direction value to trigger movement of the drawing device 140 so that a user handling the drawing device 140 may feel as though the drawing device 140 is a particular type of writing instrument contacting a particular surface type. The movement instruction 10 can be defined during a second portion of the haptic feedback loop. After the movement instruction 10 has been defined, the movement instruction 10 can be sent to the drawing device 140 and the drawing device 140 can be configured to trigger a movement based on movement instruction 10. The movement instruction 10 can be sent as a haptic feedback signal and implemented at the drawing device 140 during a third portion of the haptic feedback loop. The first portion, the second portion, and the third portion of the haptic feedback loop can collectively define a single cycle of the haptic feedback loop (i.e., a single haptic feedback loop cycle).

As another example, when the drawing device 140 is moved with a particular pressure against a surface of the touch sensitive display 160 during an interaction, the computing device 100 can be configured to define a pressure value characterizing the interaction. Based on the pressure value, the movement instruction 10 can be defined to amplify or dampen certain movements of the drawing device 140 that are responsive to the pressure against the surface of the touch sensitive display 160. In some embodiments, the movement instruction 10 can be defined, based on the pressure value, to simulate resistive movements to a user handling the drawing device 140.

The delay (e.g., processing delay) within a haptic feedback loop can be defined so that movement instruction 10 can be processed at the drawing device 140 during at least a portion of a target interaction. For example, one or more parameter values associated with a first portion of an interaction (such as the drawing of a line across the surface of the touch sensitive display 160 using the drawing device 140) can be used to define the movement instruction 10, and the movement instruction 10 can be sent to the drawing device 140 so that the drawing device 140 can move in response to the movement instruction 10 during a second portion of the interaction. Accordingly, a time period for completion of processing during a single cycle of a haptic feedback loop can be shorter than a duration of an interaction of the drawing device 140 with the touch sensitive display 160. Thus, the interaction and movement instruction 10 can be relatively synchronized.

In some embodiments, a movement of the drawing device 140 triggered by movement instruction 10 may not be precisely coordinated with each interaction of the drawing device 140 with the touch sensitive display 160. For example, one or more movement instructions, such as movement instruction 10, may be defined based on a set of interactions of the drawing device 140 with the touch sensitive display 160. In some embodiments, one or more movement instructions can be sent to the drawing device 140 to trigger movement of the drawing device 140 based on an average speed and/or length of interactions of the drawing device 140 with the touch sensitive display 160 during a specified period of time. Accordingly, the drawing device 140 may move with haptic movements based on a usage (e.g., general usage) of the drawing device 140 during a specified time period.

In some embodiments, the movement instruction 10 may be defined based on one or more predicted interactions of the drawing device 140 with the touch sensitive display. For example, one or more parameter values associated with a first portion of an interaction (such as the drawing of a line across the surface of the touch sensitive display 160 using the drawing device 140 during a first time period) can be used to predict a second portion of the interaction (during a second time period after the first time period). The second portion of the interaction can be referred to as a predicted portion of the interaction. The parameter values characterizing the first portion of the interaction can be referred to as actual parameter values because they are based on the actual interaction and are not predicted. One or more predicted parameter values associated with the predicted portion of the interaction can be defined based on the actual parameter values. The movement instruction 10 can be defined based on the predicted parameter values. In such embodiments, the movement instruction 10 can be referred to as a predicted movement instruction. The movement instruction 10 can be sent to the drawing device 140 so that the drawing device 140 can move in response to the movement instruction 10 during a second portion of the interaction. Thus, the drawing device 140 can move in response to the movement instruction 10 during the second portion of the interaction based on predicted movement of the drawing device 140.

In some embodiments, the drawing device 140 and the computing device 100 can be configured to communicate with one another via wireless communications. For example, the computing device 100 can be configured to communicate with the drawing device 140 via a Bluetooth wireless communication protocol and/or some other wireless communication protocol. In some embodiments, the drawing device 140 and the computing device 100 can be configured to communicate via a wire, and based on a wired communication protocol.

In some embodiments, the touch sensitive display 160 can be any type of touch sensitive display. The touch sensitive display 160 can be, or can include, for example, an electrostatic touchpad, a resistive touchscreen device, a surface acoustic wave (SAW) device, a capacitive touchscreen device, a pressure sensitive device, a surface capacitive device, a projected capacitive touch (PCT) device, and/or so forth.

In some embodiments, an interaction detection device (not shown in FIG. 1) can be configured to define a parameter value characterizing an interaction only if the interaction is a particular type of interaction with the touch sensitive display 160. For example, the interaction detection device can be configured to define a parameter value when the interaction is smaller than a particular size (e.g., smaller than a 6 millimeter (mm) square area), or larger than a particular size. In some embodiments, the interaction detection device can be configured to define a parameter value characterizing an interaction only if the interaction is defined by a particular drawing device such as a ballpoint pen, a graphite pencil, a stylus, and/or so forth. In some embodiments, the interaction detection device can be configured to define a parameter value characterizing an interaction defined by, for example, a finger of the user.

Figure 2:
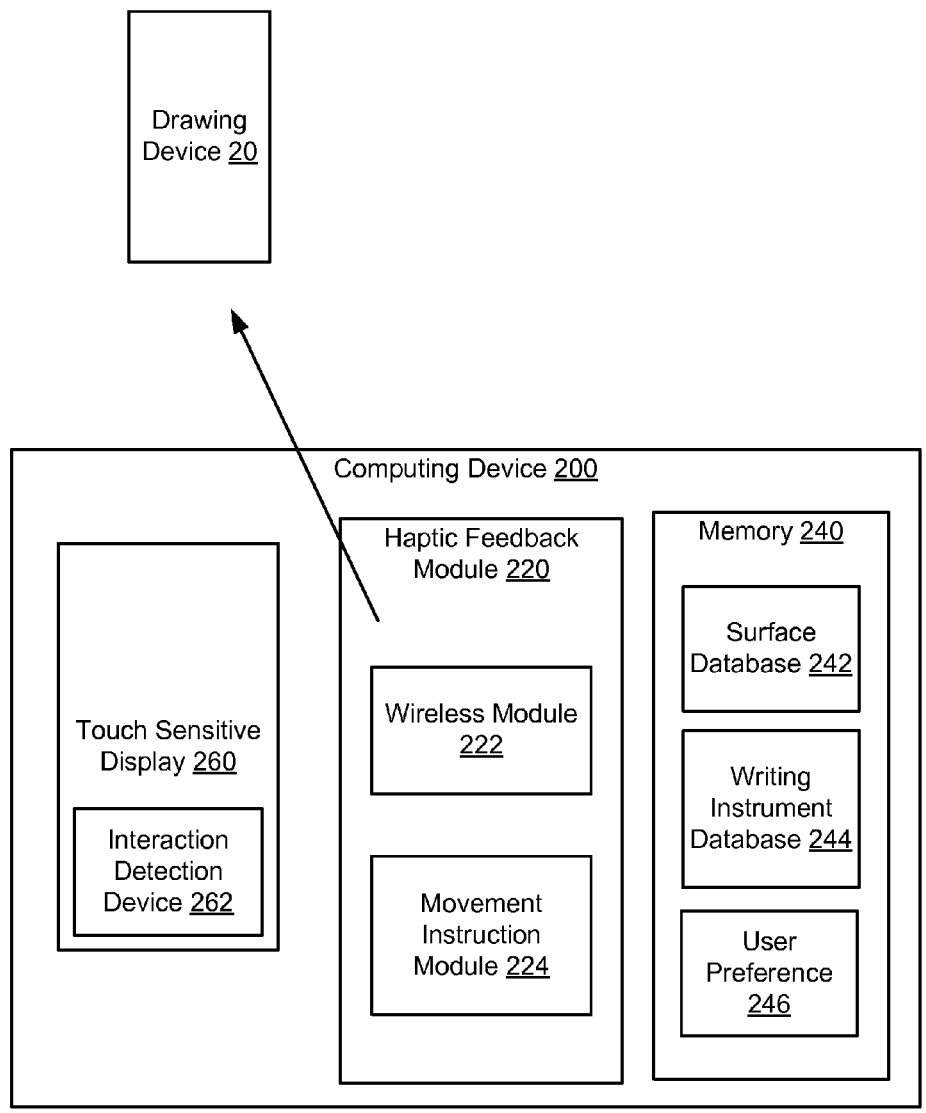
FIG. 2 is a block diagram that illustrates components that can be used to implement the functionality described in connection with FIG. 1.

FIG. 2 is a block diagram that illustrates components that can be used to implement the functionality described in connection with FIG. 1. As shown in FIG. 2, a computing device 200 includes a touch sensitive display 260, a haptic feedback module 220, and a memory 240.

As shown in FIG. 2, the touch sensitive display 260 includes an interaction detection device 262. The interaction detection device 262 is configured to define one or more parameter values characterizing at least a portion of an interaction of a drawing device 20 with the touch sensitive display 260. The touch sensitive display 260 and the interaction detection device 262 can be collectively defined so that an interaction of the user with the touch sensitive display 260 can be converted by the interaction detection device 262 into a parameter value. In other words, the interaction with the touch sensitive display 260 can be any type of interaction that can be converted by the interaction detection device 262 into a parameter value.

In this embodiment, the interaction detection device 262 is integrated into a portion of the touch sensitive display 260. In some embodiments, the interaction detection device 262 may not be integrated into a portion of the touch sensitive display 260. In some embodiments, the interaction detection device 262 may be included in, for example, the haptic feedback module 220.

In some embodiments, the interaction detection device 262 can be any type of hardware and/or software that can be used to convert an interaction of the user with the touch sensitive display 260 into a parameter value characterizing the interaction. In some embodiments, the defining of a parameter value based on an interaction with the touch sensitive display 260 can be referred to as registering the interaction.

In some embodiments, a parameter value can be, for example, a digital signal (e.g., a binary digital signal, a binary sequence of bits) and/or an analog signal that represents one or more portions of the interaction. In some embodiments, the parameter value can be an approximation of the interaction. For example, the parameter value can be configured to approximate or more portions of the interaction.

In some embodiments, the movement instruction module 224 can be configured to define one or more parameter values characterizing an interaction with the touch sensitive display 260 based on one or more signals received from the interaction detection device 262 in response to the interaction with the touch sensitive display 260. For example, the movement instruction module 224 can be configured to define an acceleration value, a speed value, and/or so forth based on one or more signals received from the interaction detection device 262 in response to an interaction with the touch sensitive display 260. In some embodiments, one or more parameter values can be defined by a parameter value module (not shown) included in the haptic feedback module 220.

The movement instruction module 224 can be configured to define a movement instruction (not shown) based on one or more parameter values characterizing an interaction with the touch sensitive display 260. In some embodiments, the movement instruction module 224 can be configured to define one or more movement instructions based on a parameter value received from the interaction detection device 262 and/or defined at the movement instruction module 224. Thus, the movement instruction module 224 can be configured to define one or more movement instructions based on raw signals received from the interaction detection device 262 and/or based on one or more parameter values characterizing an interaction with the touch sensitive display 260.

As shown in FIG. 2, the haptic feedback module 220 includes a wireless module 222. The wireless module 222 is configured to send one or more instructions to the drawing device 20. As discussed previously, the wireless module 222 can be configured to communicate with the drawing device 20 based on a wired and/or a wireless communication protocol.

As shown in FIG. 2, the memory 240 is configured to store a surface database 242. The surface database 242 can include one or more surface definition files that can be used by the movement instruction module 224 to define one or more movement instructions. Each of the surface definition files included in the surface database 242 can include, for example, one or more algorithms, one or more conditions, and/or so forth that can be used to define one or more movement instructions associated with a particular surface type (or collection of surface types). For example, a surface definition file associated with a particular surface type (e.g., a paper surface) can include an algorithm that can be used by the movement instruction module 224 to define the movement instructions so that writing on the particular surface type can be simulated via the drawing device 20. More details related to a surface database (such as surface database 242) are described, for example, in connection with FIGS. 5 and 6.

The memory 240 is also configured to store a writing instrument database 244. Similar to the surface database 242, the writing instrument database 244 includes one or more writing instrument definition files that can be used by the movement instruction module 224 to define one or more movement instructions. Each of the writing instrument definition files included in the writing instrument database 244 can include, for example, one or more algorithms, one or more conditions, and/or so forth that can be used to define one or more movement instructions associated with a particular writing instrument type (or collection of writing instrument types). For example, a writing instrument definition file associated with a particular writing instrument (e.g., a pencil, a pen) can include an algorithm that can be used by the movement instruction module 224 to define a movement instruction so that writing using the particular writing instrument can be simulated via the drawing device 20. More details related to a writing instrument database (such as writing instrument database 244) are described, for example, in connection with FIGS. 7 and 8.

In some embodiments, the writing instrument definition files and the surface definition files can be characterized as types of definition files. The definition files described above are presented by way of example only, and, in some embodiments, various types of definition files in addition to writing instrument definition files and/or surface definition files can be defined. In some embodiments, surface database 242 and the writing instrument database 244 can be combined into a single database (not shown) or can be divided into multiple different databases than those shown in FIG. 2.

In some embodiments, a definition file can be, or can include, any type of executable software module such as a computer program based on, but not limited to, micro-code or micro-instructions, machine instructions, such as produced by a compiler, code used to produce a web service, and files containing higher-level instructions that are executed by a computer using an interpreter. For example, one or more of the definition files may be implemented using Java, C++, or other programming languages (e.g., object-oriented programming languages) and development tools. In some embodiments, one or more of the definition files can be, or can be associated with, a background process with functionality that is not visible on a display. In some embodiments, one or more of the definition files can define at least a portion of one or more applications or can be associated with one or more applications.

In some embodiments, one or more writing instrument definition files and/or surface definition files can be downloaded and stored in the memory 240. For example, a writing instrument definition file not previously stored in the writing instrument database 244 can be downloaded from a writing instrument definition file repository stored in a location remote from the computing device 200. Similarly, a surface definition file not previously stored in the surface database 242 can be downloaded from a surface definition file repository stored in a location remote from the computing device 200.

In some embodiments, one or more writing instrument definition files and/or surface definition files can be stored a memory (not shown) of the drawing device 20, and sent to (e.g., downloaded to) the computing device 200 from the memory of drawing device 20. For example, a surface definition file and/or a writing instrument definition file specific to the drawing device 20 can be received at the computing device 200 and stored in the surface database 242 and/or the writing instrument database 244.

In some embodiments, one or more surface definition files and/or writing definition files can be defined using the drawing device 20. In some embodiments, the surface definition file(s) and/or writing definition file(s) can be defined using the drawing device 20 while the drawing device 20 is in a learning mode. For example, the drawing device 20 can be switched to a learning mode where the drawing device 20 can record movements (using one or more detectors) as the drawing device 20 is moved along, for example, a rough surface. The movements can be recorded in a memory (not shown) of the drawing device 20. The movements can be used to define a surface definition file (and/or a writing definition file) that can be uploaded to the computing device 200, and later used to trigger movements of the drawing device 20 when the drawing device 20 is used with the computing device 200.

As shown in FIG. 2, the memory 240 is configured to store a user preference 246. The user preference 246 (also can be referred to as a user preference file) can include a preference of a user related to a surface type and/or a writing instrument type. The movement instruction module 224 can be configured to retrieve a surface definition file from the surface database 242 based on a surface type referenced (as a preferred surface type) in the user preference 246. Similarly, the movement instruction module 224 can be configured to retrieve a writing instrument definition file from the writing instrument database 244 based on a writing instrument type referenced (as a preferred writing instrument type) in the user preference 246.

In some embodiments, the user preference 246 can include a default setting. For example, the default setting can indicate a particular writing instrument definition file (representing a writing instrument type) to be used by the movement instruction module 224 and/or a particular surface definition file (representing a surface type) to be used by the movement instruction module 224.

The user preference 246 can be defined in response to an instruction from a user. In some embodiments, the user preference 246 can indicate that a writing instruction should not be sent to the drawing device 20. In such embodiments, the drawing device 20 will not be subject to haptic feedback.

In some embodiments, the drawing device 20 can include one or more predefined capabilities related to writing instrument types and/or surface types. In some embodiments, the predefined capabilities can be related to constraints (e.g., limitations) of the drawing device 20. For example, the drawing device 20 may be a drawing device that is only configured to trigger movements related to simulation of a limited number of writing instrument types and or surface types. In such embodiments, the drawing device 20 can be configured to send one or more indicators to movement instruction module 224 of the computing device 200 that the drawing device 20 is compatible with only specified writing instrument types (i.e., specified writing instrument definition files) and/or specified surface types (i.e., specified surface definition files). Accordingly, the movement instruction module 224 of the computing device 200 can be configured to access the specified writing instrument definition files and/or the specified surface definition files.

In some embodiments, the movement instruction module 224 can be configured to query the drawing device 20 for capabilities (e.g., compatibilities) related to simulation of writing instrument types and/or surface types. For example, the movement instruction module 224 can be configured to send a request for one or more writing instrument types and/or one or more surface types that can be simulated (through movements) by the drawing device 20. In response to the request, the drawing device 20 can be configured to send, for example, a list of one or more writing instrument types and/or one or more surface types that can be simulated (through movements) by the drawing device 20.

In some embodiments, the movement instruction module 224 can be configured to determine the compatibilities related to simulation of writing instrument types and/or surface types of the drawing device 20 based on the drawing device type. For example, the movement instruction module 224 can be configured to determine that the drawing device 20 is compatible with one or more writing instrument types and/or one or more surface types that can be simulated (through movements) by the drawing device 20. The determination can be made by the movement instruction module 224 based on, for example, a model number, a version, and/or so forth of the drawing device 20. The movement instruction module 224 can be configured to store a list of one or more writing instrument types and/or one or more surface types that can be simulated for the drawing device type.

In some embodiments, the components of the computing device 200 (e.g., the haptic feedback module 220 of the computing device 200) can be configured to operate within an environment that includes an operating system. In some embodiments, the operating system can be configured to facilitate, for example, the defining of a movement instruction by the movement instruction module 224.

The computing device 200 can be, for example, a wired device and/or a wireless device (e.g., wi-fi enabled device) and can be, for example, a computing entity (e.g., a personal computing device), a server device (e.g., a web server), a mobile phone, a personal digital assistant (PDA), e-reader, and/or so forth. The computing device 200 can be configured to operate based on one or more platforms (e.g., one or more similar or different platforms) that can include one or more types of hardware, software, firmware, operating systems, runtime libraries, and/or so forth.

In some embodiments, one or more portions of the components shown in the computing device 200 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the haptic feedback module 220 can be, or can include, a software module configured for execution by at least one processor (not shown). In some embodiments, the functionality of the components can be included in different modules and/or components than those shown in FIG. 2. For example, although not shown, the functionality of the haptic feedback module 220 can be included in a different module than the haptic feedback module 220, or divided into several different modules (not shown).

In some embodiments, the computing device 200 can be included in a network. In some embodiments, the network can include multiple computing devices (such as computing device 200) and/or multiple server devices (not shown). Also, although not shown in FIG. 2, the computing device 200 can be configured to function within various types of network environments. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can be have portions based on various protocols such as Internet Protocol (IP) and/or a proprietary protocol. The network can include at least a portion of the Internet.

Memory 240 can be any type of memory device such as a random-access memory (RAM) component or a disk drive memory. As shown in FIG. 2, the memory 240 is a local memory included in the computing device 200. Although not shown, in some embodiments, the memory 240 can be implemented as more than one memory component (e.g., more than one RAM component or disk drive memory) within the computing device 200. In some embodiments, the memory 240 can be, or can include, a non-local memory (e.g., a memory not physically included within the computing device 200) within a network (not shown). For example, the memory 240 can be, or can include, a memory shared by multiple computing devices (not shown) within a network. In some embodiments, the memory 240 can be associated with a server device (not shown) on a client side of a network and can be configured to serve several computing devices on the client side of the network.

Figure 3:
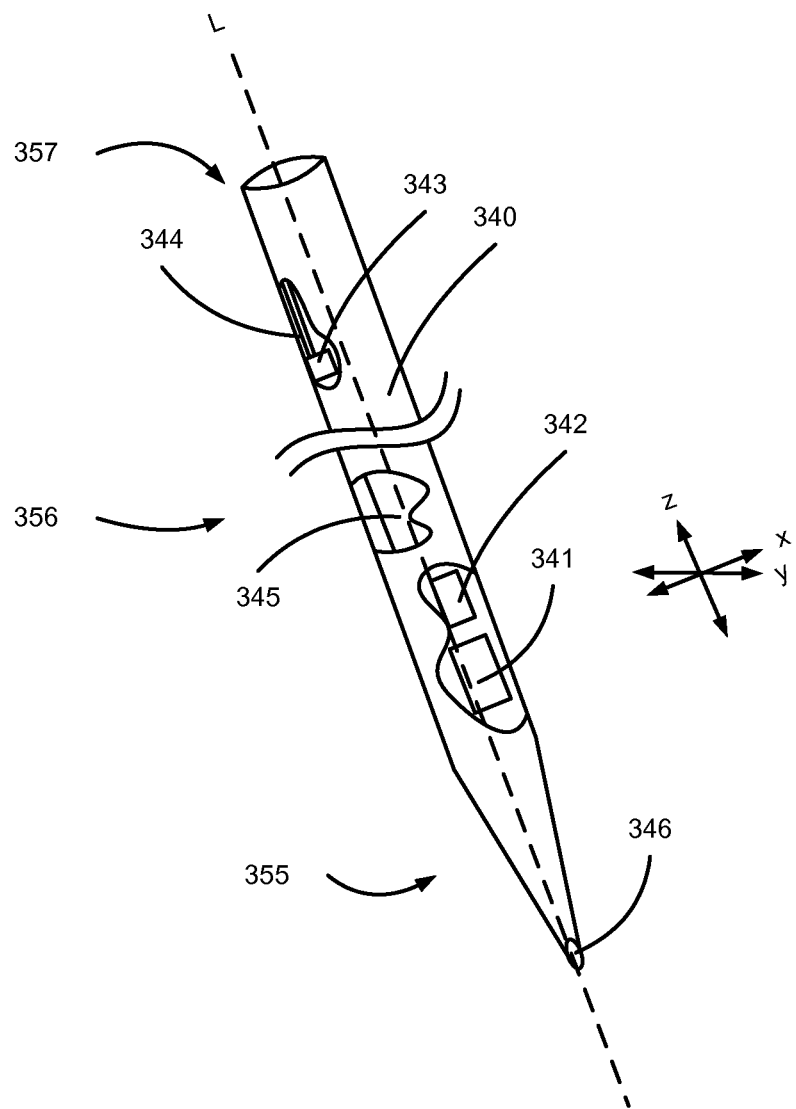
FIG. 3 is a diagram of components of a drawing device.

FIG. 3 is a diagram of components of a drawing device 340. As shown in FIG. 3, the drawing device 340 includes several components that can be collectively used to cause movement of the drawing device 340 in response to a movement instruction received from a computing device such as computing device 200 shown in FIG. 2.

As shown in FIG. 3, the drawing device 340 includes a movement mechanism 341. The movement mechanism 341 is configured to trigger movement of the drawing device 340 in response to a movement instruction received from, for example, a computing device. In some embodiments, the movement mechanism 341 can include a piezoelectric device (e.g., piezoelectric actuator device) configured to produce a linear or rotary motion, a vibratory motor that offsets mass, an electromagnetic motor, a rotating electric motor, a gyroscope, and/or so forth.

For example, a piezoelectric motor can be configured to move in response to an electrical input, which can be defined based on a movement instruction (the movement instruction can be defined based on a surface definition file or a writing instruction definition file). The amplitude and/or frequency of the electrical input, which can depend on the type of surface and/or writing instrument, can trigger the resulting physical motion of the mechanism 341. As a specific example, the amplitude of the movements triggered by the movement mechanism 341 can be relatively large (and relatively low frequency) if related to a pencil drawing on a concrete surface compared with the amplitude (and high frequency) of movements triggered by the movement mechanism 341 for movements used to simulate writing using a pen on a smooth surface. In some embodiments, the movement mechanism 341 can be a membrane motor, a motor based on static electricity, a voice coil, a motor responsive to acoustic feedback, and/or so forth.

Although not shown in FIG. 3, the drawing device 340 can include a sound device (e.g., a sound producing device) configured to produce a sound based on a writing instruction. For example, the drawing device 340 can be configured to produce one or more sounds configured to simulate a sound that would be produced by a writing instrument when interacting with a particular type of surface. As a specific example, the drawing device 340 can be configured to produce a sound of a pencil writing on a paper surface. In some embodiments, the sounds can be synchronized with movement produced by the movement mechanism 341 in response to a movement instruction. In some embodiments, the sounds can be muted. In some embodiments, the movement mechanism 341 can be deactivated while the sounds can continue to be produced by the sound device. In some embodiments, the drawing device 340 may not include the movement mechanism 341 and can include a sound device.

In some embodiments, one or more sounds can be recorded while the drawing device 340 is in a learning mode. For example, the drawing device 340 can be switched to a learning mode where the drawing device 340 can record sounds (using one or more detectors such as a microphone) as the drawing device 340 is moved along, for example, a rough surface. The sounds can be recorded in a memory (not shown) of the drawing device 340. The sounds can be uploaded to the computing device 300, and later used to trigger sounds of the drawing device 340 when the drawing device 340 is used with the computing device 300 as described herein.

The movement mechanism 341 can include a motor, a vibrating component, an oscillating device, and/or so forth to cause movement of the drawing device in response to a movement instruction. In some embodiments, the movement mechanism 341 can include a portion configured to cause movement of the drawing device 340 along the x-axis, the y-axis, and/or the z-axis shown in FIG. 3. As shown in FIG. 3, z-axis is parallel to a longitudinal axis L of the drawing device 340. In some embodiments, the movement mechanism 341 can include any type of device configured to cause a vibrational movement, a rotational movement around the longitudinal axis L, and/or so forth. In some embodiments, a movement instruction can be configured to cause random movement, periodic movement, and/or so forth of the drawing device 340.

As shown in FIG. 3, the movement mechanism 341 of the drawing device 340 is included in a portion of the drawing device 340 near a tip 346 of the drawing device 340 at the distal portion 355 of the drawing of device 340. In some embodiments, the movement mechanism 341 can be included in a portion of the drawing device 340 where a user may hold the drawing device 340. In some embodiments, a user may hold the drawing device 340 along the distal portion 355 of the drawing device 340. In some embodiments, the movement mechanism 341 can be placed in the middle portion 356 of the drawing device 344 or in a proximal portion 357 of the drawing device 340.

In some embodiments, the movement mechanism 341 can be disposed in a portion of the drawing device 340 configured for grasping by a user (e.g., a supporting region where the drawing device 240 is supported by a user). For example, a portion of the drawing device 340 can have a grasping region (not shown) defined within the drawing device 340, and the movement mechanism 341 can be disposed within the grasping region so that movements triggered by a movement instruction can be perceived (e.g., felt) by a user of the drawing device 340 in a desirable fashion. The grasping region can be defined by visual marks on the drawing device 340 and/or physical marks (e.g., notches, bumps, etc.) on the drawing device 340. In some embodiments, the movement mechanism 341 can be disposed outside of (e.g., above, below) a grasping region of the drawing device 340.

Although not shown, in some embodiments, the drawing device 340 can include one or more markings and/or one or more features (e.g., a tab, a projection, a bump, a knob) that can be used by a user to hold the drawing device 340 in a particular orientation. Specifically, the drawing device 340 can be configured to guide a user to hold the drawing device 340 in a particular orientation within, for example, a hand of the user. In some embodiments, a user may hold the drawing device 340 in a particular orientation so that one or more movements triggered by a movement instruction will simulate for a user a particular type of writing instruments and/or a particular type of surface in a desirable fashion.

Although not shown, in some embodiments, the drawing device 340 can include one or more drawing device detectors that can be used to determine an orientation of the drawing device 340 in a hand of a user. The drawing device detector can be, or can include, for example, a gyroscope, an accelerometer, and/or so forth. Information about the orientation of the drawing device 340 in a hand of the user can be sent to a computing device so that a movement instruction can be defined at the computing device based on the information about the orientation. The information about the orientation can include, for example, information about a slope of a longitudinal axis L of the drawing device 344 or an orientation of a movement mechanism such as movement mechanism 341 with respect to other components included in the drawing device 340. In some embodiments, the orientation can be represented by one or more orientation values.

Although not shown in FIG. 3, in some embodiments, more than one movement mechanism may be included in the drawing device 340. For example, an additional movement mechanism, in addition to the movement mechanism 341, can be included in the drawing device 340. In some embodiments, the additional movement mechanism can be included in a different portion of the drawing device 340 than the movement mechanism 341. In some embodiments, one or more movement mechanisms can be dedicated to causing certain types of movement. For example a first movement mechanism can be configured to cause movement along a first axis, and a second movement mechanism can be configured to cause movement along a second axis non-parallel to the first axis. As another example a first movement mechanism can be configured to cause a vibrational-type movement, and a second movement mechanism can be configured to cause an oscillating-type movement.

In some embodiments, if the drawing device 340 includes one or more drawing device detectors (not shown in FIG. 3), one or more measurement values defined by the one or more drawing device detectors can be sent to a computing device. The computing device can be configured to use the one or more measurement values to define one or more movement instructions. In some embodiments, one or more measurement values can be related to different portions of an interaction. For example, a first measurement value can be related to a first portion of an interaction during a first time period, and a second measurement value can be related to a second portion of the interaction during a second time period after the first time period. In some embodiments, a measurement value can be similar to, or the same as, haptic parameter values defined at a computing device as described in connection with FIGS. 1 and 2.

In some embodiments, if the drawing device 340 includes one or more drawing device detectors, one or more measurement values defined by the one or more drawing device detectors can be used to modify a movement instruction. The movement instruction can be modified at the computing device or at the drawing device 340. For example, a movement instruction can be defined based on an interaction of the drawing device 340 with a touch sensitive display. During the interaction, the drawing device 340 can be configured to define a measurement value using a drawing device detector based on the interaction, and the measurement value can be sent to the computing device. The computing device can be configured to modify the movement instruction based on the measurement value. The measurement value, or a derivative thereof, can be applied against (e.g., multiple against as a scalar) a movement defined within the movement instruction at the computing device to amplify or dampen the movement. In some embodiments, the measurement value may not be sent to the computing device. Instead, after the movement instruction is received at the drawing device 340, the movement instruction can be modified at the drawing device 340 based on the measurement value.

As shown in FIG. 3, the drawing device 340 includes a wireless receiver 343 coupled to an antenna 344. Although not shown, and some embodiments, the drawing device 340 can also include a wireless transmitter. In such embodiments, the wireless receiver 343 can be a transceiver. The wireless receiver 343 and the antenna 344 are collectively configured to receive, for example, one or more movement instructions transmitted from a computing device. Although not shown in FIG. 3, if communicating via a wired communication protocol, the drawing device 340 can include a wired-type receiver.

As shown in FIG. 3, the drawing device 340 includes a computing module 342. In some embodiments, the computing module 342 can include one or more processors and/or one or more memory components. The computing module 342 can be configured to process one or more movement instructions received via the wireless receiver 343 and antenna 344. The computing module 342 can be configured to parse the one or more movement instructions and/or can be configured to cause the movement mechanism 341 to move based on the one or more movement instructions. In some embodiments, the computing module 342 can be integrated into the movement mechanism 341. In some embodiments, the computing module 342 can be configured to process and/ or trigger sending information related to a capability (e.g., a compatibility) of the drawing device 340 to simulate one or more surface types and/or writing instrument types.

In some embodiments, computing module 342 can be configured to modify one or more movement instructions received at the drawing device 340 if the drawing device 340 is not capable of executing the movement instruction. For example, the computing module 342 can be configured to modify a movement instruction if a particular movement specified with the movement instruction cannot be executed (or can only be partially executed) by the drawing device 340. Thus, the movement can be configured to modify the movement instruction so that the movement instruction is compatible with the capabilities of the drawing device 340. In some embodiments, the computing module 342 can be configured to trigger execution of only a portion of a movement instruction that can be executed by the drawing device 340.

In some embodiments, the computing module 342 can be configured to define one or more acknowledgment messages that can be sent to a computing device in response to receipt of a movement instruction. In such embodiments, the computing module 342 can be configured to send the acknowledgment message via a wireless transmitter (not shown).

As shown in FIG. 3, the drawing device 340 also includes a battery 345. The battery 345 can be a removable battery and/or can be a rechargeable battery. The battery 345 can be configured to provide power to the components of the drawing device 340.

The tip 346 can be configured (e.g., can be made of a material) to facilitate the detection of an interaction of the drawing device 340 with, for example, a touch sensitive display such as that described in connection with FIGS. 1 and 2. For example, the tip 346 can be a conductive tip that can facilitate detection by a touch sensitive display of an interaction of the drawing device 340 with the touch sensitive display. Although not shown in FIG. 3, in some embodiments, the drawing device 340 can have multiple tips (such as tip 346) or portions that can be used as tips.

In some embodiments, the drawing device 340 can be configured to define one or more movement instructions at the drawing device 340 based on one more signals from a drawing device detector (not shown) configured to detect an interaction of the drawing device 340 with a touch sensitive display of a computing device. In such embodiments, a cycle of a haptic feedback loop (i.e., a haptic feedback cycle) could be entirely performed at the drawing device 340 (or in conjunction with a haptic feedback cycle including the computing device) using, for example, the computing module 342 (which can function as a haptic feedback module such as haptic feedback module 220 shown in FIG. 2). In other words, the haptic feedback cycle would not be performed between the drawing device 340 and a computing device such as the computing devices shown in FIGS. 1 and 2. If the drawing device 340 is configured to perform a haptic feedback cycle without signaling (e.g., a movement instruction) from a computing device, the drawing device 340 can be configured to simulate an interaction (e.g., a tactile interaction) of a particular type of writing instrument with a particular type of surface independent of a computing device.

In some embodiments, the drawing device 340 can include one or more of the components included within the computing device 200 (e.g., the haptic feedback module 220 of the computing device 200) shown in FIG. 2 so that the drawing device 340 can define one or more movement instructions at the drawing device 340. For example, the drawing device 340 could include one or more portions of a haptic feedback module and a memory such as those shown in FIG. 2. Specifically, the drawing device 340 could include a movement instruction module configured to define a movement instruction based on a surface definition file stored in a surface database and/or based on a writing instrument definition files stored in a writing instrument database. The movement instruction module could also be configured to define a movement instruction based on an interaction determined by a drawing device detector (not shown) installed within the drawing device 340. The drawing device detector can be configured to detect an interaction of the drawing device 340 with a surface such as a surface (e.g., a surface of a display) of a computing. As discussed above, the drawing device detector could be, or could include, for example, a gyroscope, an accelerometer, and/or so forth. In some embodiments, the drawing device 340 can be configured to define one or more movement instructions based on one or more parameter values received from a computing device in response to interactions of the drawing device 340 with the computing device.

FIG. 4 is a flowchart that illustrates a method for triggering movement of a drawing device. In some embodiments, the drawing device can be a drawing device such as drawing device 340 shown in FIG. 3.

As shown in FIG. 4, a movement instruction is received at a drawing device (block 400). The movement instruction a can be defined by a movement instruction module (such as movement instruction module 224 shown in FIG. 2) in response to the drawing device contacting a surface of a display of a computing device.

A movement of the drawing device is triggered based on the movement instruction using a movement mechanism (block 410). In some embodiments, the movement mechanism can be any type of device configured to cause a movement (e.g., a rotational movement, a vibrational movement) of the drawing device. In some embodiments, the movement instruction can be configured to trigger a movement of the drawing device to simulate (for a user of the drawing device) an interaction using a particular type of writing instrument and/or an interaction with a particular type of surface.

FIG. 5 is a diagram that illustrates entries in a surface database 500. As shown in FIG. 5 the surface database 500 includes surface identifiers 510, surface conditions 520, and movement instructions 530. In some embodiments, the surface database 500 can be stored in and accessed from a memory of a computing device such as memory 240 of computing device 200 shown in FIG. 2. In some embodiments, the surface conditions 520 can be characterized as a type of parameter value condition.

Each of the surface identifiers 510 represents a particular surface type. For example, the surface identifier S1 (shown in column 510) can represent a paper surface. A particular surface identifier can be selected for use during a cycle of a haptic feedback loop by a user of a drawing device and a computing device. As shown in FIG. 5, the surface identifier S1 is associated with multiple rows of surface conditions 520 and multiple rows of movement instructions 530 corresponding with the multiple rows of surface conditions 520.

Each of the surface conditions 520 represents a condition that may be satisfied based on one or more parameter values. For example, surface condition "P1>A1" (shown in column 520) can be satisfied when parameter value P1 is greater than A1, and surface condition "P1<A2" (shown in column 520) can be satisfied when parameter value P1 is less than A2.

Each of the parameter values can characterize at least a portion of an interaction of a drawing device with a touch sensitive display. For example, parameter value P1 (shown in column 520) can represent an acceleration value of an interaction of a drawing device with a touch sensitive display.

The movement instructions 530 are movement instructions that can be sent to (or used to define another movement instruction that can be sent to) a drawing device based on the surface condition 520 being satisfied. For example, if surface condition "P2=A3" (shown in column 520) is satisfied, movement instruction M3 (shown in column 530), which appears on the same row as the surface condition, can be sent to a drawing device. The movement instruction M3 can specify, for example, a particular type of movement, such as a vibrational movement, at a specified rate. As another example, if surface condition "P1<A2" (shown in column 520) is satisfied, no movement instruction may be sent to a drawing device because this surface condition is not associated (on the same row) with a movement instruction as illustrated by the line in the movement instructions 530 column.

As a specific example, if the surface identifier S1 (shown in column 510) represents a concrete surface, the movement instructions M1 and M3 can each be configured to trigger vibrational movements in a direction (e.g., a vertical direction) aligned along the drawing device with different amplitudes that simulate bumpy movements when writing on a concrete surface. The movement instruction M1 could be configured to trigger smaller vibrational movements than movement instruction M3, because movement instruction M1 could be associated with drawing device movement of a higher acceleration on a touch sensitive display than movement instruction M1.

In some embodiments, the entries included in the surface database 500 can be used during a cycle of a haptic feedback loop. For example, a surface type represented by surface identifier S1 (shown in column 510) can be selected for use during a cycle of a haptic feedback loop by a user of the drawing device and a computing device. An interaction drawing device detector of a touch sensitive display can be configured to define a parameter value characterizing an interaction of the drawing device with a touch sensitive display of the computing device. For example, in response to the interaction, a parameter value P2 can be defined based on signals associated with the interaction. If the parameter value P2 satisfies the surface condition "P2=A3" (shown in column 520), movement instruction M3 (shown in column 530), which appears on the same row as the surface condition 520, can be sent to a drawing device during the cycle of the haptic feedback loop. Finally, a movement mechanism at the drawing device can be configured to move in accordance with the movement instruction M3.

In some embodiments, one or more portions of the surface database 500 shown in FIG. 5 can be a representation of one or more surface definition files. In this embodiment, a surface definition file associated with a surface type represented by surface identifier S1 is represented within the surface database 500 as the collection of surface conditions 520 and corresponding movement instructions 530 associated with surface identifier S1.

In some embodiments, one or more portions of the surface database 500 can be customized, for example, by a user (e.g., an administrator). For example, one or more surface conditions 520 and/or movement instructions 530 can be added to the surface database 500 by a user via, for example, a user input device such as a keyboard. In some embodiments, one or more surface conditions 520 and/or movement instructions 530 included in the surface database 500 can be modified in a customized fashion by a user.

In some embodiments, a surface type (which can be represented by a surface identifier) (i.e., a customized surface type) can be added to the surface database 500. One or more surface conditions 520, and corresponding movement instructions 530, can be associated with the surface type added to the surface database 500.

Although not shown in FIG. 5, multiple movement instructions 530 can be triggered in response to a single surface condition 520 being satisfied. In some embodiments, multiple surface conditions 520 can be defined so that a single movement instruction 530 is triggered in response to at least one of the multiple surface conditions 520 being satisfied.

Figure 6:
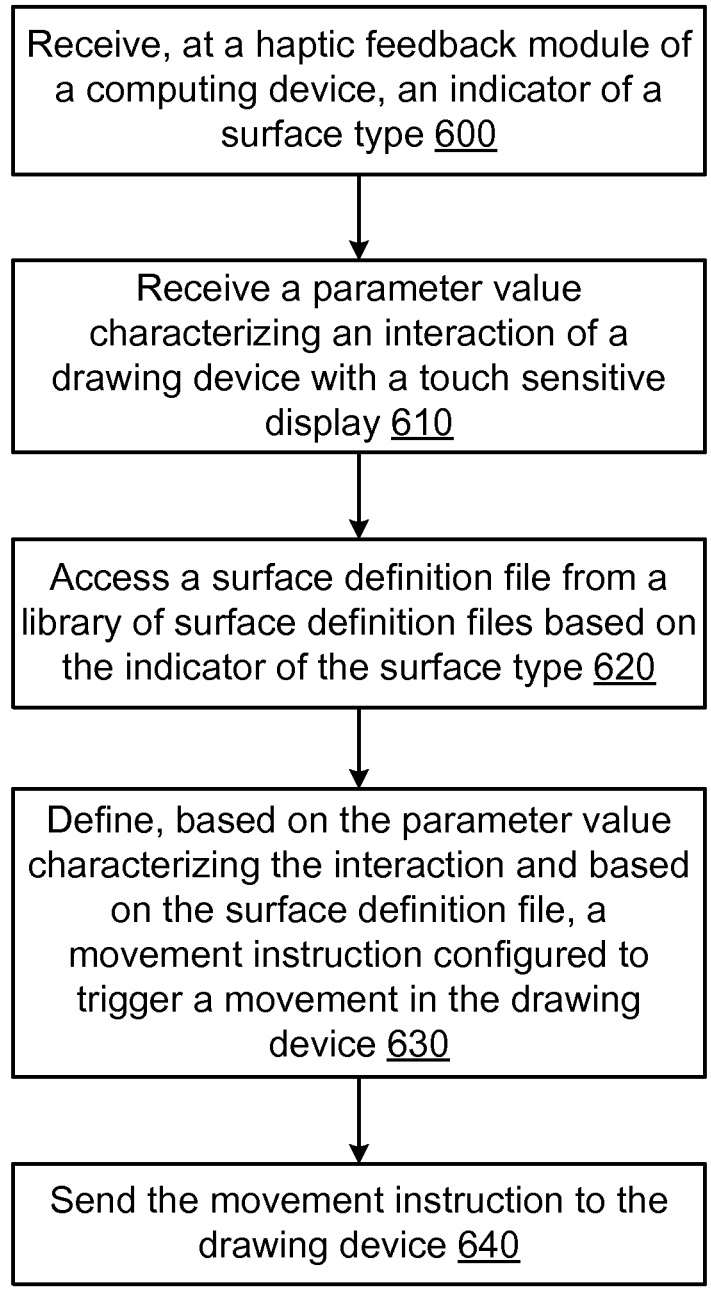
FIG. 6 is a flowchart that illustrates a method for using a surface definition file to trigger movement of a drawing device.

FIG. 6 is a flowchart that illustrates a method for using a surface definition file to trigger movement of a drawing device. In some embodiments, one or more portions of the method can be performed by one or more components of a computing device (such as computing device 200 shown in FIG. 2).

As shown in FIG. 6, an indicator of a surface type is received at a haptic feedback module of a computing device (block 600). In some embodiments, the indicator of the surface type can be selected by a user and/or can be based on a user preference defined by a user. In some embodiments, the surface type can be, for example, a paper surface, a cardboard surface, a glass surface, a glossy paper surface, a concrete surface, a plastic surface, and/or so forth.

A parameter value characterizing an interaction of a drawing device with a touch sensitive display of the computing device is received (block 610). In some embodiments, the parameter value characterizing the interaction can include a parameter value characterizing a direction of the interaction, an acceleration of the interaction, and/or so forth. The parameter value characterizing the interaction can characterize any portion of the interaction.

A surface definition file is accessed from a library of surface definition files at the computing device based on the indicator of the surface type (block 620). In some embodiments, the surface definition file can be, or can include, for example, one or more algorithms, one or more conditions, and/or so forth that can be used to define one or more movement instructions associated with the surface type. In some embodiments, the surface definition file can be accessed from a surface database. In some embodiments, the surface definition file can be expressed as a collection of surface conditions that correspond with one or more movement instructions.

A movement instruction configured to trigger a movement in the drawing device is defined based on the parameter value characterizing the interaction and based on the surface definition file (block 630). The movement instruction can be configured to trigger a movement of the drawing device to simulate (for a user of the drawing device) an interaction with the surface type. In some embodiments, the movement instruction can be defined at, for example, a movement instruction module.

The movement instruction is sent to the drawing device (block 640). In some embodiments, the movement instruction can be sent via a wireless communication protocol such as a Bluetooth protocol. In some embodiments, the movement instruction can be sent, for example, as part of a packet or in a series of packets.

Figure 7:
FIG. 7 is a diagram that illustrates entries in a writing instrument database.

FIG. 7 is a diagram that illustrates entries in a writing instrument database 700. As shown in FIG. 7 the writing instrument database 700 includes writing instrument identifiers 710, writing instrument conditions 720, and movement instructions 730. In some embodiments, the writing instrument database 700 can be stored in and accessed from a memory of a computing device such as memory 240 of computing device 200 shown in FIG. 2. In some embodiments, the writing instrument conditions 720 can be characterized as a type of a parameter value condition.

Each of the writing instrument identifiers 710 represents a particular writing instrument type. For example, the writing instrument identifier X1 (shown in column 710) can represent a pencil or a pen. A particular writing instrument identifier can be selected for use during a cycle of a haptic feedback loop by a user of a drawing device and a computing device. As shown in FIG. 7, the writing instrument identifier X1 is associated with multiple rows of writing instrument conditions 720 and multiple rows of movement instructions 730, which correspond with the multiple rows of writing instrument conditions 720.

Each of the writing instrument conditions 720 represents a condition that may be satisfied based on one or more parameter values. For example, writing instrument condition "Q2=G3" (shown in column 720) can be satisfied when parameter value Q2 is equal to G3.

Each of the parameter values can characterize at least a portion of an interaction of a drawing device with a touch sensitive display. For example, parameter value Q1 (shown in column 720) can characterize at least a portion of an interaction of a drawing device with a touch sensitive display.

The movement instructions 730 are movement instructions that can be sent to (or used to define another movement instruction that can be sent to) a drawing device based on the writing instrument condition 720 being satisfied. For example, if writing instrument condition "Q2=G3" (shown in column 720) is satisfied, movement instruction F2 (shown in column 730), which appears on the same row as the writing instrument condition, can be sent to a drawing device. The movement instruction F2 can specify, for example, a particular type of movement, such as a rotational movement, at a specified rate. As a specific example, relatively large vibrational movements (e.g., linear movements, rotational movements) at a relatively low rate (using a motor) can be used to simulate a rough tip of a crayon on a writing surface. In some embodiments, some of the vibrational movements can be pulsed or randomly triggered to simulate larger pieces of crayon coming off of a tip of a crayon when drawing. Relatively small vibrational movements (e.g., linear movements, rotational movements) at a relatively high rate (using a motor) can be used to simulate a pencil tip on the writing surface. In some embodiments, the vibrational movements can be relatively regular and/or in a specified pattern.

In some embodiments, the entries included in the writing instrument database 700 can be used during a cycle of a haptic feedback loop. For example, a writing instrument type represented by writing instrument identifier X1 (shown in column 710) can be selected for use during a cycle of a haptic feedback loop by a user of the drawing device and a computing device. An interaction detection device of a touch sensitive display can be configured to define a parameter value characterizing an interaction of the drawing device with a touch sensitive display of the computing device. For example, in response to the interaction, a parameter value Q1 can be defined based on signals associated with the interaction. If the parameter value Q1 satisfies a portion of the writing instrument condition "Q1>G1 or Q2<G4" (shown in column 720), movement instruction F1 (shown in column 730), which appears on the same row as the writing instrument condition 720, can be sent to a drawing device during the cycle of the haptic feedback loop. Finally, a movement mechanism at the drawing device can be configured to move in accordance with the movement instruction F1.

In some embodiments, one or more portions of the writing instrument database 700 shown in FIG. 7 can be a representation of one or more writing instrument definition files. In this embodiment, a writing instrument definition file associated with a writing instrument type represented by writing instrument identifier X1 is represented within the writing instrument database 700 as the collection of writing instrument conditions 720 and corresponding movement instructions 730 associated with writing instrument identifier X1.

In some embodiments, one or more portions of the writing instrument database 700 can be customized, for example, by a user (e.g., an administrator). For example, one or more writing instrument conditions 720 and/or movement instructions 730 can be added to the writing instrument database 700 by a user via, for example, a user input device such as a keyboard. In some embodiments, one or more writing instrument conditions 720 and/or movement instructions 730 included in the writing instrument database 700 can be modified in a customized fashion by a user.

In some embodiments, a writing instrument type (which can be represented by a writing instrument identifier) (i.e., a customized writing instrument type) can be added to the writing instrument database 700. One or more writing instrument conditions 720, and corresponding movement instructions 730, can be associated with the writing instrument type added to the writing instrument database 700.

As shown in FIG. 7, writing instrument condition "Q1>G1 or Q2<G4" (shown in column 720) is defined so that a single movement instruction 730 is triggered in response to at least a portion of a writing instruction condition 720 being satisfied. In some embodiments, multiple writing instrument conditions 720 can be defined so that a single movement instruction 730 is triggered in response to at least one of the multiple writing instrument conditions 720 being satisfied. Although not shown in FIG. 7, multiple movement instructions 730 can be triggered in response to a single writing instrument condition 720 being satisfied.

In some embodiments, a movement instruction can be defined based on a combination of definition files such as a combination of a surface definition file (as represented within a surface database such as surface database 500 shown in FIG. 5) and a writing instrument definition file (as represented within a writing instrument database such as writing instrument database 700 shown in FIG. 7). The movement instruction can be defined based on the combination of definition files so that one or more movements (e.g., vertical movements, horizontal movements) of a drawing device triggered by movement instructions from the combination of definition files can be coordinated to simulate an interaction of, for example, a particular type of writing instrument on a particular type of writing surface. In such embodiments, movement instructions associated with one or more parameter value conditions can be defined as, for example, modifiers of one or more movement instructions associated with one or more other parameter value conditions. Also, in such embodiments, modification of a first movement instruction (e.g., based on a writing definition file) can be based on a second movement instruction (e.g., based on a surface definition file). The modification can be performed based on, for example, a rules-based algorithm.

For example, a first movement instruction can be defined in response to a surface condition being satisfied. The first movement instruction can be modified based on a second movement instruction in response to a writing instrument condition being satisfied. The second movement instruction can be a scalar that is multiplied against a portion of the first movement instruction to modify, for example, an amplitude of a movement defined within the first movement instruction. As another example, a first movement instruction can be defined in response to a first surface condition being satisfied, and the first movement instruction can be modified based on a second movement instruction that is triggered in response to a second surface condition being satisfied.

In some embodiments, conflicts can arise between definition files (which can be expressed within databases such as the surface database 500 shown in FIG. 5 and or the writing instrument database 700 shown in FIG. 7). For example, conflicts can arise when multiple parameter value conditions (e.g., writing instrument conditions included in writing instrument definition files, surface conditions included in surface definition files) are satisfied. In some embodiments, conflicting parameter value conditions can be the same type of parameter value condition. For example, two conflicting parameter value conditions can both be writing instrument conditions, or can both be surface conditions. In some embodiments, the conflicting parameter value conditions can be different types of conditions. For example, one of the conflicting parameter value conditions can be a writing instrument condition, and the other conflicting parameter value condition can be a surface condition.

For example, a conflict can arise between a movement instruction triggered by a writing instrument condition and a movement instruction triggered by a surface condition. As a specific example, movement instruction M1 (shown in column 530 of FIG. 5) can be triggered in response to surface condition "P1>A1" (shown in column 520 in FIG. 5) being satisfied. Also, movement instruction F2 (shown in column 730 of FIG. 7) can be triggered in response to surface condition "Q2=G3" (shown in column 720 in FIG. 7) being satisfied. Movement instruction M1 and movement instruction F2 may be movement instructions that cannot be physically performed together.

Conflicts between parameter value conditions (e.g., writing instrument conditions and/or surface conditions) can be resolved based on, for example, a rules-based algorithm, priority values associated with each of the presentation values, and/or so forth. For example, movement instructions (which can be triggered by different parameter value conditions being satisfied) that cannot be physically performed concurrently during a specified time period can be performed in a serial fashion based on a rules-based algorithm. In some embodiments, the rules-based algorithm can be configured to account for the particular surface type and/or the particular writing instrument type involved in the conflict. In some embodiments, conflicting movement instructions can each be executed (or sent for execution) in a serial fashion based on a rank ordering of the each of the movement instructions from the conflicting movement instructions.

As another example, several movement instructions (which can be triggered by different parameter value conditions being satisfied) that are conflicting can be combined into a single movement instruction based on a rules-based algorithm. For example, a first movement instruction can specify movement of a drawing device in a first direction at a first rate, and a second movement instruction can specify movement of the drawing device in a second direction at a second rate. In some embodiments, the drawing device can be triggered to move in a third direction that is a combination of the first direction and the second direction, and/or can be triggered to move at a third rate that is a combination of the first rate and the second rate. The third direction and/or the third rate can be included in a third movement instruction different from the first movement instruction and the second movement instruction. In some embodiments, the first movement instruction and/or the second movement instruction can be discarded when a conflict between the movement instructions arises.

In some embodiments, conflicts related to definition files (e.g., surface definition files, writing instrument definition files) can be resolved by a conflict resolution module (not shown). The conflict resolution module can be included in, for example, the haptic feedback module 220 shown in FIG. 2.

Figure 8:
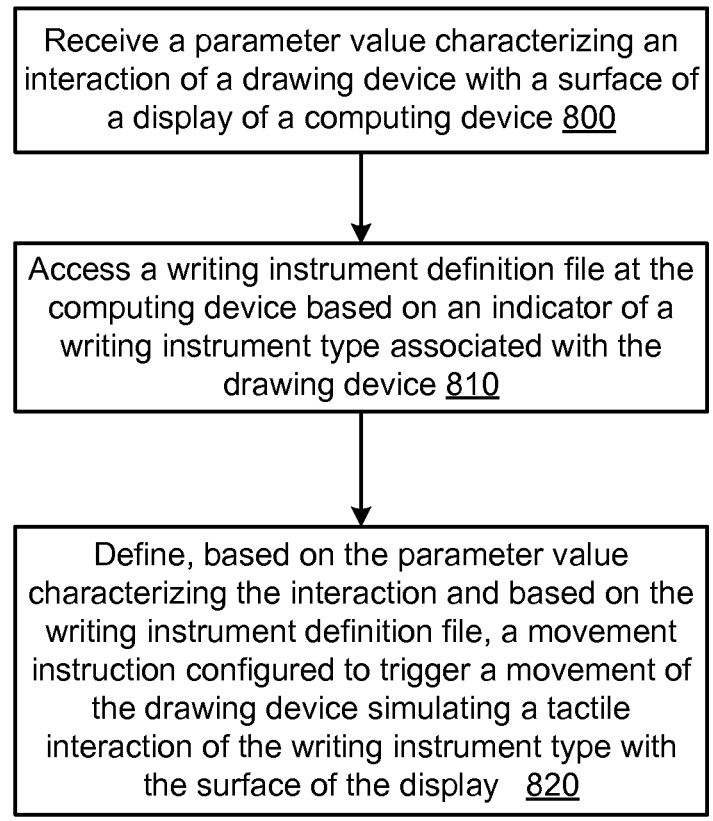
FIG. 8 is a flowchart that illustrates a method for defining a movement instruction based on a writing instrument definition file.

FIG. 8 is a flowchart that illustrates a method for defining a movement instruction based on a writing instrument definition file. In some embodiments, one or more portions of the method can be performed by one or more components of a computing device (such as computing device 200 shown in FIG. 2).

A parameter value characterizing an interaction of a drawing device with a surface of a display of a computing device is received (block 800). In some embodiments, the parameter value characterizing the interaction can include a parameter value characterizing a direction of the interaction, an acceleration of the interaction, and/or so forth. In some embodiments, the parameter value characterizing the interaction can characterize any portion of the interaction.

A writing instrument definition file is accessed at the computing device based on an indicator of a writing instrument type associated with the drawing device (block 810). In some embodiments, the writing instrument definition file can be accessed from a writing instrument database. In some embodiments, the writing instrument definition file can be expressed as a collection of writing instrument conditions that correspond with one or more movement instructions.

A movement instruction configured to trigger a movement of the drawing device simulating a tactile interaction of the writing instrument type with the surface of the display is defined based on the parameter value characterizing the interaction and based on the writing instrument definition file (block 820). The movement instruction can be configured to trigger a movement of the drawing device to simulate (for a user of the drawing device) an interaction using the writing instrument type. In some embodiments, the movement instruction can be defined at, for example, a movement instruction module.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory computer-readable storage medium storing instructions that when executed cause a computing device to perform a process, the instructions comprising instructions to:
   receive, at a haptic feedback module of the computing device, an indicator of a surface type;
   receive a parameter value characterizing an interaction of a drawing device with a touch sensitive display of the computing device;
   access surface definition data at the computing device based on the indicator of the surface type, the surface definition data including at least one surface condition with an associated movement instruction for the indicator of the surface type;
   determine that the parameter value characterizing the interaction satisfies the surface condition;
   access writing instrument definition data at the computing device based on an indicator of a writing instrument type, the writing instrument definition data including at least one movement instruction associated with the instrument type;

identifying a conflict between the movement instruction in the surface definition data and the movement instruction in the writing instrument definition data;
define a resolved movement instruction by resolving the conflict by one of a ranking order, a rules-based algorithm, or generating a third movement instruction that differs from the movement instruction from the surface definition data and the movement instruction from the writing instrument definition data, the resolved movement instruction configured to trigger a movement in the drawing device; and
send the resolved movement instruction to the drawing device.

2. The non-transitory computer-readable storage medium of claim 1, the instructions further comprising instructions to, in the absence of identifying a conflict:
define the resolved movement instruction based on a combination of the movement instruction in the writing instrument definition data and the movement instruction in the surface definition data.

3. The non-transitory computer-readable storage medium of claim 1, wherein the parameter value characterizing the interaction is a vector including at least one of a direction or a speed of the interaction of the drawing device with the touch sensitive display, and the resolved movement instruction is defined based on the vector meeting the surface condition.

4. The non-transitory computer-readable storage medium of claim 1, wherein the resolved movement includes a rotational movement.

5. The non-transitory computer-readable storage medium of claim 1, wherein the surface data includes a plurality of parameter conditions with respective associated movement instructions for the indicator of the surface type, wherein the movement instruction is a first movement instruction, and wherein the instructions further comprise instructions to:
identify, based on a second parameter value characterizing the interaction meeting a second parameter condition, a second movement instruction configured to trigger a movement in the drawing device;
modify the first movement instruction based on the second movement instruction; and
send the modified movement instruction to the drawing device.

6. The non-transitory computer-readable storage medium of claim 1, wherein the conflict is resolved by the rules-based algorithm.

7. A method, comprising:
receiving a parameter value characterizing an interaction of a drawing device with a surface of a display of a computing device;
accessing writing instrument definition data at the computing device based on an indicator of a writing instrument type associated with the drawing device, the writing definition data including at least one writing instrument condition with an associated movement instruction for the indicator of the writing instrument type;
accessing at the computing device, surface definition data based on an indicator of a surface type, the surface definition data including a movement instruction associated with the surface type;
determining that the parameter value characterizing the interaction satisfies the writing instrument condition;
identifying a conflict between the movement instruction in the surface definition data and the movement instruction in the writing instrument definition data; and
defining a resolved movement instruction by resolving the conflict by one of a ranking order, a rules-based algorithm, or generating a third movement instruction that differs from the movement instruction from the surface definition data and the movement instruction from the writing instrument definition data, the resolved movement instruction configured to trigger a movement of the drawing device simulating a tactile interaction of the writing instrument type with the surface of the display.

8. The method of claim 7, wherein the parameter value characterizes a first portion of the interaction of the drawing device with the surface of the display, the method further comprising:
receiving from the drawing device a measurement value characterizing a second portion of the interaction of the drawing device with the surface of the display, and
modifying the resolved movement instruction based on the measurement value.

9. The method of claim 7, wherein the parameter value is a predictive parameter value characterizing a first portion of the interaction occurring during a first time period, the method further comprising:
receiving an actual parameter value characterizing a second portion of the interaction during a second time period before the first time period; and
defining the predictive parameter value based on the actual parameter value.

10. The method of claim 7, further comprising:
determining that the movement instruction in the surface definition data and the movement instruction in the writing instrument definition data do not conflict; and
defining the resolved movement instruction based on combination of the movement instruction in the surface definition data and the movement instruction in the writing instrument definition data.

11. The method of claim 7, further comprising:
downloading the writing instrument definition data from a memory of the drawing device; and
sending the resolved movement instruction to the drawing device.

12. The method of claim 7, further comprising:
activating a learning mode;
recording movements of the drawing device in the learning mode; and
generate new surface definition data with a new movement instruction based on the recorded movements.

13. An apparatus, comprising:
a tip of a drawing device configured to contact a display of a computing device during a first portion of a haptic feedback cycle;
a wireless module of the drawing device configured to receive a movement instruction from the computing device during a second portion of the haptic feedback cycle, the movement instruction based on a parameter that characterizes an interaction of the drawing device with the computing device meeting a condition associated with a surface type or a writing instrument type;
a movement mechanism of the drawing device configured to trigger a movement of the drawing device simulating a tactile interaction of the writing instrument type with the surface type based on the movement instruction; and
a learning module of the drawing device configured to:
record movements of the drawing device;
generate surface definition data based on the recorded movements; and
send the generated surface definition data to the computing device.

14. The apparatus of claim 13, further comprising: a computing module of the drawing device configured to trigger sending of information related to a capability of the drawing device to the computing device to simulate the writing instrument type and the surface type.

15. The apparatus of claim 13, comprising:
a drawing device detector of the drawing device configured to determine an orientation of the drawing device and configured to send an orientation value characterizing the orientation as the parameter to the computing device, the movement instruction being identified at the computing device based on the orientation value meeting the condition.

16. The apparatus of claim 13, wherein the movement is a first movement,
the apparatus further comprising:
a drawing device detector of the drawing device configured to define a second parameter value characterizing a second movement of the drawing device; and
a computing module of the drawing device configured to modify the movement instruction based on the second parameter value characterizing the second movement.

17. The apparatus of claim 13, wherein the movement instruction is defined at the computing device during a third portion of the haptic feedback cycle occurring after the first portion of the haptic feedback cycle.

18. The apparatus of claim 13, wherein the movement mechanism is disposed in a grasping region of the drawing device,
the apparatus further comprising:
a computing module of the drawing device configured to modify the movement instruction based on a capability of the drawing device.

19. The apparatus of claim 13, further comprising: a computing module of the drawing device configured to send at least one of a writing instrument definition file or a surface definition file to the computing device.

20. The apparatus of claim 13, wherein the movement instruction is a first movement instruction,
the apparatus further comprising:
a drawing device detector of the drawing device configured to define a signal based on an interaction of the drawing device with the display of the computing device; and
a computing module of the drawing device configured to define a second movement instruction based on the signal.

* * * * *